United States Patent Office 3,833,589
Patented Sept. 3, 1974

---

3,833,589
SUBSTITUTED SYDNONIMINE NITRATE ESTERS
William R. Simpson, Mendham, N.J., assignor to Sandoz-Wander, Inc., Hanover, N.J.
No Drawing. Filed July 31, 1972, Ser. No. 276,396
Int. Cl. C07d 51/70
U.S. Cl. 260—268 N    5 Claims

ABSTRACT OF THE DISCLOSURE

Nitrate esters of sydnonimines, e.g. 3-(4-[β-hydroxyethyl]piperazino)-N⁶-ethoxycarbonyl sydnonimine nitrate ester, are useful as anti-anginal agents.

---

This invention relates to sydnonimine derivatives. More particularly, this invention concerns nitrate esters of sydnonimines and N⁶-substituted sydnonimines, their preparation and their use in pharmaceutical compositions.

The compounds of this invention may be represented by the following structural formula:

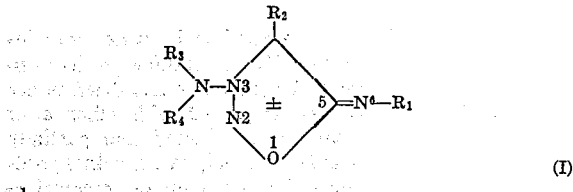

(I)

where $R_1$ represents hydrogen or —COOR$_5$;
$R_2$ represents hydrogen or lower alkyl, i.e., alkyl having 1 to 4 carbon atoms, e.g., methyl, ethyl, isopropyl and the like;
$R_3$ represents —(R$_6$)—CH$_2$ONO$_2$;
$R_4$ represents —(R$_7$)—CH$_3$ or —(R$_7$)—CH$_2$ONO$_2$; or
$R_3$ and $R_4$ together with N represents

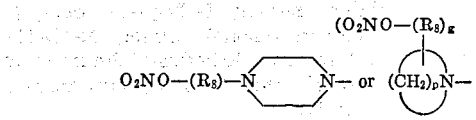

where $R_5$ is lower alkyl as defined above;
$R_6$ and $R_7$ each independently represents straight or branched chained alkylene having 1 to 7 carbon atoms, e.g., methylene, ethylene, t-butylene, and the like;
$p$ is 4, 5 or 6;
$q$ is 0 or 1; and
$R_8$ is lower alkylene, i.e., alkylene having 1 to 3 carbon atoms, e.g., methylene, ethylene, isopropylene and the like, and provided that —(R$_8$)$_q$—ONO$_2$ is not attached to a carbon atom adjacent to the nitrogen atom when $q$ is 0.

The process for preparing the compounds of formula (I) in which (R$_1$) is COOR$_5$ may be represented by the following reaction scheme:

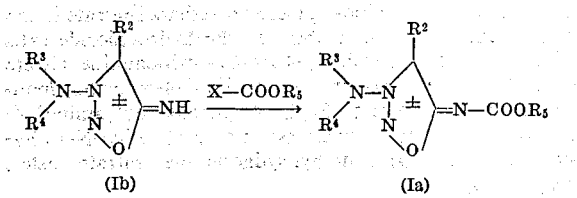

where

X is halo having an atomic weight of about 35 to 80, and $R_2$, $R_3$, $R_4$ and $R_5$ are as defined above.

The compounds of formula (Ia) are prepared by treating a compound of the formula (Ib) with an alkyl halo formate preferably alkyl chloroformate in an inert solvent, such as the ethers, e.g. diethylether, tetrahydrofuran, aromatic hydrocarbons, e.g., benzene, toluene and the like, or pyridines, the latter being especially preferred. The temperature of the reaction is not critical but it is preferred that the process be carried out at a temperature between about 0° to 50° C., especially 20° to 30° C. For optimum results, the reaction is run for about 15 to 30 hours; preferably 18 to 24 hours. The particular solvent used in the preparation and the reaction time are not critical. The compounds of formula (Ia) may be recovered using conventional techniques such as crystallization.

The compounds of formula (Ib) are prepared in accordance with the following reaction scheme:

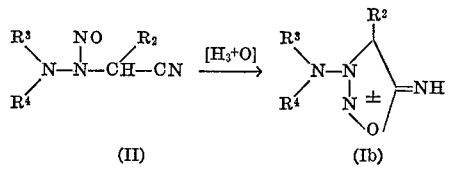

where $R_2$, $R_3$ and $R_4$ are as set out above.

The compounds of formula (Ib) are prepared by cyclizing a compound of formula (II) in an inert solvent under strong acidic conditions. The strong acidic conditions are preferably provided by the strong inorganic acids, such as hydrochloric acid, sulfuric acid, nitric acid and the like, especially hydrochloric acid. Although the particular solvent used is not critical, the alcohols are preferred, especially methanol. The temperature of the reaction is not critical, but it is preferred that the process be carried out at temperatures between about 0° to 50° C.; preferably 20° to 30° C. For optimum results, the reaction is run for about 1 to 5 hours, preferably 2 to 3 hours. The reaction time is not critical. The compounds of formula (Ib) may be recovered using conventional techniques such as crystallization.

The process for preparing the compounds of formula (II) may be represented by the following reaction scheme:

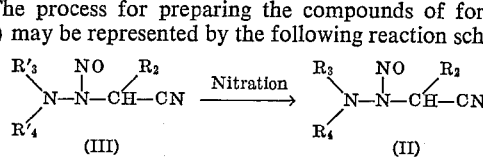

where $R'_3$ is —(R$_6$)—CH$_2$OH, and
$R'_4$ is —(R$_7$)—CH$_3$ or —(R$_7$)—CH$_2$OH, or
$R'_3$ and $R'_4$ together with N represent

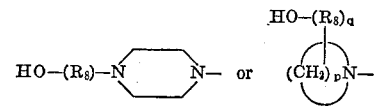

where $p$, $q$, $R_2$, $R_3$, $R_4$, $R_6$, $R_7$ and $R_8$ are as defined above, and provided that —(R$_8$)$_q$—OH is not attached to a carbon atom adjacent to the nitrogen atom when $q=0$.

The compounds of the formula (II) are prepared by treating the compounds of formula (III) with a nitrating agent. The nitration is carried out with conventional nitrating agents, preferably a mixture of nitric acid or metal nitrate and a carboxylic acid anhydride having 3 to 8 carbon atoms, especially acetic anhydride. It is preferred that the nitration be carried out at temperatures between about minus (—) 70° C. to 50° C., especially at about —15° C. to 20° C. The reaction is also preferably carried out in excess reagent, especially excess carboxylic acid anhydride or a mixture of carboxylic acid anhydride and organic acid. If desired, inert organic solvents, in particular, tetrahydrofuran, may be used. The nitrating agent, the temperature and the particular solvent used are not critical. The compounds of formula (II) are recovered by conventional techniques, e.g., evaporation. The compounds (II) in which $R_3$ and $R_4$ together with N form a piperazine ring may also be recovered in the form of their pharmaceutically acceptable weak organic acid addition salts such as the tartrate, maleate, citrate, succinate, acetate, benzoate, p-toluenesulfonate, benzenesulfonate and the like. Such salts are readily prepared by reacting the free base with an appropriate acid in an inert solvent.

The compounds of formula (II) can also be prepared by the following reaction scheme:

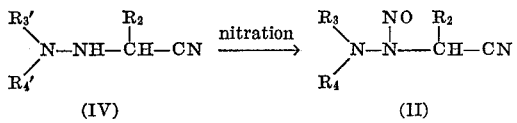

where $R_2$, $R_3$, $R_4$, $R_3'$ and $R_4'$ are as defined above.

The nitration of the compounds of formula (IV) is carried out in the same manner as described above for the nitration of the compounds of formula (III).

Many of the compounds of formulas (III) and (IV) are known and may be prepared according to methods disclosed in the literature from known materials. The compounds of formulas (III) and (IV) which are not specifically disclosed in the art may be prepared by analogous methods from known materials.

The compounds of formula (I) are useful because they possess pharmacological activity in animals. In particular, the compounds are useful as anti-anginal agents, as indicated by an increase in coronary blood flow and by a reduction of myocardial oxygen consumption in an anesthetized dog given 0.5 to 10 milligrams per kilogram of body weight of a compound of formula (I) intravenously.

For such usage, compound (I) may be administered orally or parenterally, or sublingually, as such or admixed with conventional pharmaceutical carriers. They may be administered orally in such forms as tablets, dispersible powders, granules, capsules, syrups and elixirs, sublingually as tablets and parenterally as solutions, suspensions, dispersions, emulsions, and the like, e.g., a sterile injectable aqueous suspension. These pharmaceutical preparations may contain up to about 90% of the active ingredient in combination with the carrier or adjuvant.

These compounds of formula (Ib) may be similarly administered in the form of their non-toxic pharmaceutically acceptable acid addition salts. Such salts possess the same order of activity as the free base, and are readily prepared by reacting the base with an appropriate acid and accordingly are included within the scope of the invention. Representative of such salts are the mineral acid salts, such as the hydrochloride, hydrobromide, sulfate, phosphate and the like and the organic salts, such as succinate, benzoate, acetate, p-toluenesulfonate, benzenesulfonate and the like.

The anti-anginal effective dose of active ingredient employed for the treatment of angina may vary depending on the particular compound employed and the severity of the condition being treated. However, in general, satisfactory results are obtained when the compounds (I) are administered at a daily dosage of from about 0.01 milligrams to about 25 milligrams per kilogram of animal body weight, preferably given in divided doses two to four times a day, or in sustained release form. For most large mammals, such as primates, in need of said treatment, the total daily dosage is from about 0.7 to about 50 milligrams. Dosage forms suitable for internal use comprise from about 0.175 to about 25 milligrams of the active compound in intimate admixture with a solid or liquid pharmaceutically acceptable carrier or diluent.

The preferred pharmaceutical compositions from the standpoint of preparation and ease of administration are solid compositions, particularly hardfilled capsules and tablets containing about 1 to 25 milligrams of active ingredient.

Tablets containing the ingredients indicated below may be prepared by conventional techniques and are useful in treating angina pectoris at a dose of one tablet 2 to 4 times a day.

| Ingredients: | Weight (mg.), tablet |
|---|---|
| 3-(4-[β-hydroxyethyl]piperazino) - 4 - methyl-$N^6$-ethoxycarbonyl sydnonimine nitrate ester | 5 |
| Mannitol | 46 |
| Lactose | 46 |
| Polyvinyl pyrrolidone | 2.0 |
| Magnesium stearate | 1.0 |

EXAMPLE 1

3-(4-[β-hydroxyethyl]piperazino)-4-methyl-$N^6$-ethoxycarbonyl sydnonimine nitrate ester Step A: 4-(N-[1-cyanoethyl]-N-nitroso)amino-1-piperazine-ethanol-nitrate.—A solution of 6.42 g. of 4-(N-[1-cyanoethyl]-N-nitroso)amino-1-piperazine ethanol in 2 ml. of tetrahydrofuran is added over a period of 6 minutes dropwise to a stirred cooled (−10° to −5° C.) mixture of 11.9 ml. of acetic anhydride and 3.95 ml. of 90% nitric acid.

The resulting mixture is poured into ice water containing excess ammonia mixture. The crystalline product obtained is filtered off, washed with water and dried under vacuum. The solid is then triturated with ether after which the combined extracts are filtered and partially evaporated. Heptane is added to precipitate the final product, 4-(N-[1-cyanoethyl]-N-nitroso)amino-1-piperazine-ethanol-nitrate (m.p. 58–60° C.).

When 1 - (N-[1-cyanoethyl]-N-nitroso)amino-4-piperidinol, 1 - (N - [1 - cyanoethyl]-N-nitroso)amino-4-piperidin ethanol, N-(N-[1-cyanoethyl]-N-nitroso)amino-imidodiethanol or 2-(N-[N-cyanomethyl-N-nitroso]amino-N-ethylamino)ethanol is used in place of 4-(N-[1-cyanoethyl]-N-nitroso)amino-1-piperazine-ethanol in the above reaction, there is obtained 1-(N-[1-cyanoethyl]-N-nitroso)amino-4-piperidinol nitrate; 1-(N-[1-cyanoethyl]-N-nitroso)amino-4-piperidin ethanol nitrate; N-(N-[1-cyanoethyl]-N-nitroso)amino-imidodiethanol dinitrate; or 2 - (N - [N-cyanomethyl-N-nitroso]amino-N-ethylamino) ethanol nitrate, respectively.

Step B: 3-(4-[β-hydroxyethyl]-piperazino)-4-methyl-sydnonimine nitrate ester.—A solution of 2.5 g. of 4-(N-[1 - cyanoethyl] - N-nitroso)amino-1-piperazine-ethanol-nitrate dissolved in 50 ml. of methanol is added to 200 ml. of a 4N methanolic solution of hydrochloric acid. After stirring for 2 hours the alcohol is removed by evaporation leaving a white crystalline solid. The solid is recrystallized from ethyl alcohol and dried over anhydrous ethyl ether yielding the hydrochloride salt of 3-(4-[β-hydroxyethyl]-piperazino)-4-methyl sydnonimine nitrate ester.

When an equivalent amount of 1-(N-[1-cyanoethyl]-N-nitroso)amino-4-piperidinol nitrate; 1-(N-[1-cyanoethyl]-N-nitroso)amino-4-piperidin ethanol nitrate; N-(N-[1-cyanoethyl]-N-nitroso)amino-imidodiethanol dinitrate or 2 - (N - [N - cyanomethyl - N - nitroso]-amino-N-ethylamino)ethanol nitrate is used in place of the 4-N-[1-cyanoethyl]-N-nitroso)amino-1-piperazine-ethanol-nitrate in the above reaction, there is obtained the hydrochloride salts of 3-(4-hydroxypiperidino)-4-methyl-sydnonimine nitrate ester; 3-(4-[β-hydroxyethyl]-piperidino)-4-methyl-sydnonimine nitrate ester; 3-(di-[β-hydroxyethyl]amino)-4-methyl-sydnonimine nitrate ester; or 3-(N-ethyl-N-[β-hydroxyethyl]amino)-4-methyl-sydnonimine nitrate ester, respectively.

Step C: 3-(4-[β-hydroxyethyl]piperazino)-4-methyl-$N^6$-ethoxycarbonyl sydnonimine nitrate ester.—To a flask equipped with a stirrer, dropping funnel and condenser, there is added at room temperature, 2.2 g. of the hydrochloride salt of 3-(4-[β-hydroxyethyl] piperazino)-4-methyl-sydnonimine nitrate ester suspended in 10 ml. of pyridine to 3.6 ml. of ethyl chloroformate. Stirring is initiated and continued for 21 hours at room temperature, and the resulting solution is treated with 50 ml. of water and then extracted with 150 ml. of chloroform. The chloroform extracts are dried over sodium sulfate, and the chloroform is then removed by evaporation. The residue is recrystallized from 95% ethanol to yield 3-(4-[β-hydroxyethyl] piperazino) - 4-methyl-$N^6$-ethoxycarbonyl sydnonimine nitrate ester.

When an equivalent amount of 3-(4-hydroxypiperidino)-4-methyl sydnonimine nitrate ester, 3-(4-[β-hydroxyethyl]piperidino)-4-methyl sydnonimine nitrate ester; 3-(di-[β-hydroxyethyl]amino)-4-methyl sydnonimine nitrate ester, or 3-(N-ethyl-N-[β-hydroxyethyl]amino) sydnonimine nitrate ester, is used in place of 3-(4-[β-hydroxyethyl]-piperazino) sydnonimine nitrate ester in the above reaction there is obtained 3-(4-hydroxypiperidino)-4-methyl-$N^6$-ethoxycarbonyl sydnonimine nitrate ester; 3 - (4 - [β-hydroxyethyl]piperidino)-4-methyl-$N^6$-ethoxycarbonyl sydnonimine nitrate ester; 3-(di-[β-hydroxyethyl] amino)-4-methyl-$N^6$-ethoxycarbonyl sydnonimine nitrate ester; or 3-(N-ethyl-N-[β-hydroxyethyl]amino)-$N^6$-ethoxycarbonyl sydnonimine nitrate ester respectively.

The 3 - (4 - [β-hydroxyethyl]piperazino)-4-methyl-$N^6$-ethoxy carbonyl sydnonimine nitrate ester of this example is an effective anti-anginal agent when orally administered to an animal suffering from angina at a dosage of 5 milligrams four times per day.

EXAMPLE 2

3-(4-[β-hydroxyethyl]piperazino)-$N^6$-ethoxycarbonyl sydnonimine nitrate ester

Four grams of the compound, 4-(N-cyanomethyl)-amino-1-piperazine ethanol is dissolved in 2 ml. of acetic acid and added over a period of 6 minutes dropwise to a stirred cooled (−10° to −5° C.) mixture of 18 ml. of acetic anhydride and 6.00 ml. of 90% nitric acid.

The resulting mixture is poured into ice water containing an excess of ammonia solution. The crystalline product obtained is filtered off, washed with water and dried under vacuum. The solid is then triturated with ether after which the combined extracts are filtered and partially evaporated. Heptane is added to precipitate the final product, 4 - (N - cyano-methyl-N-nitroso)amino-1-piperazine-ethanol-nitrate (m.p. 58–60° C.).

Following the procedure of Example I steps (b) and (c) and using an equivalent amount of 4-(N-cyanomethyl-N-nitroso)amino-1-piperazine ethanol nitrate in place of 4-(N-[1-cyanoethyl]-N-nitroso)-amino-1-piperazine ethanol nitrate, there is obtained before treatment with ethyl chloroformate, the hydrochloride salt of 3-(4-[β-hydroxyethyl]-piperazino) sydnonimine nitrate ester; and after treatment with ethyl chloroformate there is obtained 3-(4-[β-hydroxyethyl]-piperazino)-$N^6$-ethoxycarbonyl sydnonimine nitrate ester.

The 3 - (4 - [β-hydroxyethyl]piperazino)-$N^6$-ethoxycarbonyl sydnonimine nitrate ester of this example is an effective anti-anginal agent when administered to an animal suffering from angina at a dosage of 5 milligrams 2 to 4 times a day.

What is claimed is:

1. A compound of the formula

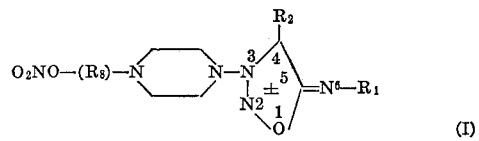

(I)

where
$R_1$ represents hydrogen or $COOR_5$;
$R_2$ represents hydrogen or lower alkyl;
$R_5$ is lower alkyl; and
$R_8$ is lower alkylene.

2. The compound of claim 1 which is 3-(4-[β-hydroxyethyl]piperazino)-4-methyl-$N^6$ - ethoxycarbonyl sydnonimine nitrate ester.

3. The compound of claim 1 which is 3-(4-[β-hydroxyethyl]piperazino)-$N^6$-ethoxycarbonyl sydnonimine nitrate ester.

4. The compound of claim 1 which is 3-(4-[β-hydroxyethyl]piperazino)-4-methyl-syndnonimine nitrate ester.

5. The compound of claim 1 which is 3-(4-[β-hydroxyethyl]piperazino)-sydnonimine nitrate ester.

References Cited

UNITED STATES PATENTS

| 3,312,690 | 4/1967 | Masuda | 260—268 H |
|---|---|---|---|
| 3,470,182 | 9/1967 | Hardtmann | 260—268 N |
| 3,637,699 | 1/1972 | Gabel et al. | 260—256.4 Q |
| 3,637,700 | 1/1972 | Gabel et al. | 260—256.5 R |
| 3,637,701 | 1/1972 | Gabel et al. | 260—256.4 Q |
| 3,642,793 | 2/1972 | Imashiro et al. | 260—268 H |
| 3,277,108 | 10/1966 | Daeniker | 260—307 F |
| 3,254,093 | 5/1966 | Huisgen | 260—307 A |
| 3,427,317 | 2/1969 | Kier | 260—307 A |
| 3,766,185 | 10/1973 | Simpson | 260—268 N |

DONALD G. DAUS, Primary Examiner

U.S. Cl. X.R.

260—268 H, 293.67, 293.87, 307 G, 250, 267, 272